United States Patent
Nasserrafi et al.

(10) Patent No.: US 12,503,773 B2
(45) Date of Patent: Dec. 23, 2025

(54) METHOD TO PRODUCE VOID-FREE FERROUS AND NON-FERROUS AEROSPACE STRUCTURAL CASTINGS

(71) Applicant: Spirit AeroSystems, Inc., Wichita, KS (US)

(72) Inventors: Rahbar Nasserrafi, Wichita, KS (US); Jennifer Lyn Wilson, Wichita, KS (US); Ni Yen Luu, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 220 days.

(21) Appl. No.: 18/111,635

(22) Filed: Feb. 20, 2023

(65) Prior Publication Data
US 2024/0279815 A1 Aug. 22, 2024

(51) Int. Cl.
C23C 28/02 (2006.01)
B23P 6/04 (2006.01)
C21D 8/02 (2006.01)

(52) U.S. Cl.
CPC ............ *C23C 28/021* (2013.01); *B23P 6/045* (2013.01); *C21D 8/0242* (2013.01); *C21D 8/0278* (2013.01); *C21D 2251/02* (2013.01); *C21D 2261/00* (2013.01)

(58) Field of Classification Search
CPC ....... B23P 6/04; B23P 6/045; Y10T 29/49746
See application file for complete search history.

(56) References Cited

U.S. PATENT DOCUMENTS

| | | | |
|---|---|---|---|
| 3,472,742 A | 10/1969 | Brinks | |
| 3,758,347 A * | 9/1973 | Stalker | C22F 1/00 228/119 |
| 4,250,610 A | 2/1981 | Wilbers et al. | |
| 4,346,128 A | 8/1982 | Loch | |
| 4,659,288 A * | 4/1987 | Clark | F01D 5/28 29/889.23 |
| 5,098,010 A * | 3/1992 | Carmichael | B23K 1/203 285/289.5 |
| 5,578,187 A | 11/1996 | Zitko et al. | |
| 5,816,090 A | 10/1998 | Hodge et al. | |
| 6,695,960 B1 * | 2/2004 | Bacos | C23C 18/34 205/74 |

(Continued)

FOREIGN PATENT DOCUMENTS

| | | |
|---|---|---|
| JP | H03211205 A | 1/1991 |
| JP | H04309495 A | 11/1992 |
| WO | 2013081802 | 6/2013 |

OTHER PUBLICATIONS

European Search Report and Written Opinion Application No. 241589489.5, Dec. 6, 2024, 15 pages, European Patent Office, Munich, Germany.

*Primary Examiner* — Sarang Afzali (74) *Attorney, Agent, or Firm* — Stinson LLP (57) ABSTRACT

A method of treating a cast metal matrix, the method comprising steps of depositing a self-fluxing first layer of material on an outer surface-connected void of the cast metal matrix, depositing a second layer of material on the cast metal matrix thereby closing off the outer surface-connected void so that the outer surface-connected void is an effective internal void, and hot isostatic pressing the cast metal matrix so that the self-fluxing first layer facilitates healing the effective internal void and complete metallurgical bonding of the surfaces of the outer surface-connected void.

10 Claims, 5 Drawing Sheets

(56) References Cited

U.S. PATENT DOCUMENTS 7,047,612 B2 * 5/2006 Bridges .................. B23P 6/02
29/402.09
2004/0175845 A1 * 9/2004 Molla .................... H10B 61/00
257/E27.005

* cited by examiner

Prior Art

METHOD TO PRODUCE VOID-FREE FERROUS AND NON-FERROUS AEROSPACE STRUCTURAL CASTINGS

BACKGROUND

High performance precision cast parts often contain voids such as porosities, cracks, hot tears, shrinkage cavities, inter-dendritic shrinkage, sponge shrinkage, and other defects that reduce quality and structural integrity of the parts. These types of defects, together with non-metallic inclusions, constitute the most predominant sources of scrap and rework for high performance alloys used for aircraft structure.

The unpredictable location, size, frequency, and proximity of such defects reduces confidence in castings for use as primary aircraft structural elements and thus incurs a design weight increase penalty of between approximately 25% and 50%. The major weight increase has resulted in limited use of castings for aircraft structure to only applications that cannot be economically produced by other means and required alloys that cannot be made by wrought processes (e.g., directionally solidified or single crystal alloys or precipitation hardened creep resistant alloys that are extremely hard to forge or roll).

Hot isostatic pressing is often used to heal internal voids of cast metal matrices, but it does not heal outer surface-connected voids. Nickel plating can be used to close off outer surface-connected voids, thereby allowing hot isostatic pressing to heal them. However, this is discouraged due to complex alteration of outer surface chemistry, the additional step of plating removal, and added costs in favor of optimizing casting parameters to achieve an acceptable outer surface. Furthermore, surfaces of the closed-off outer surface-connected voids do not always form a complete metallurgical bonded joint such that even though the void has been filled, structural integrity may still be compromised. This must be discovered during inspection, resulting in significant scrap and rework cycles.

SUMMARY

Embodiments of the present invention solve the above-mentioned problems and other problems and provide a distinct advance in the art of treating metal castings. More particularly, embodiments of the invention provide a method of hot isostatic pressing metal castings and castings produced by such method.

An embodiment of the invention is a method of treating a cast metal matrix of a casting. First, an outer surface of the cast metal matrix and surfaces of outer surface-connected voids are coated to create a uniform, self-fluxing first layer.

The outer surface of the cast metal matrix and the surfaces of the outer surface-connected voids are then coated a second time to create a second layer over the first layer, thereby closing off the outer surface-connected voids.

The cast metal matrix is then subjected to hot isostatic pressing. This allows internal voids (including closed-off outer surface-connected voids) to collapse under the differential pressure between atmosphere outside the casting and the internal voids. The surfaces of the internal voids produce a metallurgical bond via diffusion of atoms, thereby destroying the internal voids, effectively eliminating any defects, and improving mechanical properties of the casting.

Another embodiment of the invention is a casting obtained by the following steps. First, an outer surface of the cast metal matrix and surfaces of outer surface-connected voids are coated to create a uniform, self-fluxing first layer.

The outer surface of the cast metal matrix and the surfaces of the outer surface-connected voids are then coated a second time to create a second layer over the first layer, thereby closing off the outer surface-connected voids.

The cast metal matrix is then subjected to hot isostatic pressing. This allows internal voids (including closed-off outer surface-connected voids) to collapse under the differential pressure between atmosphere outside the casting and the internal voids. The surfaces of the internal voids produce a metallurgical bond via diffusion of atoms, thereby destroying the internal voids, effectively eliminating any defects, and improving mechanical properties of the casting. Furthermore, the material of the self-fluxing first layer is diffused in the cast metal matrix.

Another embodiment of the invention is a method of treating a cast metal matrix. First, an outer surface of the cast metal matrix and surfaces of a surface-connected void of the cast metal matrix are mechanically cleaned. The outer surface of the cast metal matrix and surfaces of surface-connected voids of the cast metal matrix are then chemically cleaned.

A self-fluxing first layer of material is then autocatalytically deposited on the outer surface of the cast metal matrix and the surfaces of the outer surface-connected void. The cast metal matrix is then cleaned.

A second layer of material is then electroplated onto the cast metal matrix over the first layer, thereby closing off the outer surface-connected void so that the outer surface-connected void is an effective internal void. The cast metal matrix is then cleaned.

The cast metal matrix is then subjected to hot isostatic pressing so that the self-fluxing first layer facilitates healing the effective internal void and complete metallurgical bonding of the surfaces of the effective internal void.

The second layer of material is then removed. The cast metal matrix is then heat treated. The cast metal matrix is then tested to ensure the cast metal matrix meets design requirements.

Another embodiment of the invention is a method of treating a cast metal matrix of a casting. First, the outer surface of the cast metal matrix is mechanically cleaned to remove contaminants and scaling from the outer surface. The outer surface, including surfaces of outer surface-connected voids, is then chemically cleaned. This acts as a surface activation (i.e., a chemical or charge modification of a surface to improve the results of further surface treatment such as autocatalytic deposition or electroplating.

The outer surface, including the surfaces of the outer surface-connected voids, is then coated via autocatalytic deposition to create a uniform, self-fluxing first layer. The first layer has a controlled thickness and composition of effective melting point depressants such as boron or phosphorous. The autocatalytic deposition reaches deep into the outer surface-connected voids that cannot otherwise be easily accessed. The first layer includes nickel, nickel-chromium, nickel-cobalt, nickel-cobalt-chromium or the like in a phosphorous or boron-containing autocatalytic solution. The cast metal matrix, or more specifically the first layer, is then mechanically and/or chemically cleaned.

The outer surface is then subjected to electroplating to create a second layer over the outer surface, thereby closing off the outer surface-connected voids. In other words, the electroplating step seals the outer surface, thus effectively changing the outer surface-connected voids into internal voids (hereinafter closed-off outer surface-connected voids).

The second layer includes nickel, cobalt, chromium, or a co-deposition thereof for iron, nickel, or cobalt base castings. Alternatively, the second layer may include copper for titanium castings. Additionally, aluminum or other precipitation hardening elements can be co-deposited with electroplating in the form of powders that have been pre-coated with nickel. The cast metal matrix, or more specifically the second layer, is then mechanically and/or chemically cleaned.

The cast metal matrix is then subjected to hot isostatic pressing, which includes placing the cast metal matrix in a chamber at an elevated temperature and pressure for a duration of time. The heat causes the cast metal matrix to become "plastic", allowing voids to collapse under the differential pressure between atmosphere outside the casting and the internal voids (including closed-off outer surface-connected voids). The surfaces of the voids produce a metallurgical bond via diffusion of atoms, thereby destroying the voids, effectively eliminating any defects, and improving mechanical properties of the casting.

Importantly, the phosphorous and/or boron of the first layer diffuse out of the surfaces of the closed-off outer surface-connected voids and into the cast metal matrix. This in turn reduces their concentration at the surfaces of the closed-off outer surface-connected voids, which increases the melting temperature near the closed-off outer surface-connected voids until cast metal matrix material near the closed-off outer surface-connected voids isothermally solidifies and produces a strong metallurgical bonded joint.

The cast metal matrix is then inspected and tested via non-destructive testing (NDI), strength testing, electrical testing, and the like, which ensures removal of all internal voids and defects. The cast metal matrix is also heat treated, which imparts additional desired mechanical properties, such as increased strength, to the cast metal matrix. The electroplated second layer may then be removed, depending on the application. This may be performed via chemical stripping, machining, or the like.

The above-described method and casting provide several advantages. For example, closing off the outer surface-connected voids allows them to be healed via hot isostatic pressing.

Complete metallurgical bonding is also achieved by removing insoluble oxide or nitride films from the surfaces of the outer surface-connected voids. Bonding is facilitated by cleaning and hence surface activation that penetrates all the way through the outer surface-connected voids. This is further assisted by formation of a transient liquid phase achieved through uniform coating of the outer surface-connected voids via autocatalytic coating with solutions containing melting point depressants, which results in isothermal solidification and diffusion bonding of the adjoining surfaces of the closed-off outer surface-connected voids.

After initial melting, the diffusion of elements away from the surfaces of the closed-off outer surface-connected voids into the cast metal matrix reduces the concentration of melting point depressant, causing isothermal solidification and complete bonding of the surfaces of the healed outer surface-connected voids. Furthermore, co-electrodeposition of key elements such as nickel, chromium, iron, and pre-electroless nickel coated titanium or aluminum powders can allow coating with similar chemistry as the parent metal, thereby eliminating alloy dilution and the need for subsequent removal of the electroplating second layer after hot isostatic pressing.

The above-described invention helps eliminate scrap and the need for rework, thereby saving hundreds of millions of dollars in the aircraft industry alone. The above quality, performance, and economic enhancements greatly reduce superalloy and stainless steel casting acquisition costs and help increase share of high performance casting for aircraft and defense applications.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the present invention. The following detailed description is, therefore, not to be taken in a limiting sense. The scope of the present invention is defined only by the appended claims, along with the full scope of equivalents to which such claims are entitled.

The present invention is directed to a method of treating a cast metal matrix of a high-performance precision casting via hot isostatic pressing and a casting formed according to the method. The method improves hot isostatic pressing cast metal matrices and eliminates certain deficiencies thereof.

The invention is suitable for precision castings of high-performance alloys (e.g., nickel base superalloys, maraging steels, martensitic steel, precipitation hardening ferrous alloys, titanium alloys, and the like). Such castings are useful in aircraft, spacecraft, engines, military vehicles and equipment, and the like, where defects such as the ones shown in FIGS. 1A-D are particularly undesirable. It should be understood by one having ordinary skill in the art that the invention provided herein can also be used in other industries as well to improve casted parts. To that end, the invention will be described in terms of an exemplary part 100 formed of a casting 102 having a cast metal matrix 104, as shown in FIGS. 2 and 3A-D.

Figure 1A:
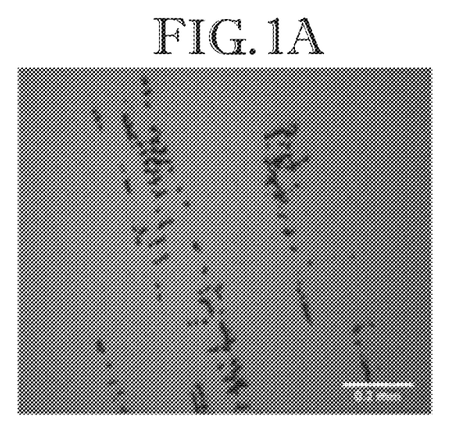
FIG. 1A is an image of a cast metal matrix including solidification shrinkage in accordance with the prior art.
Figure 1B:
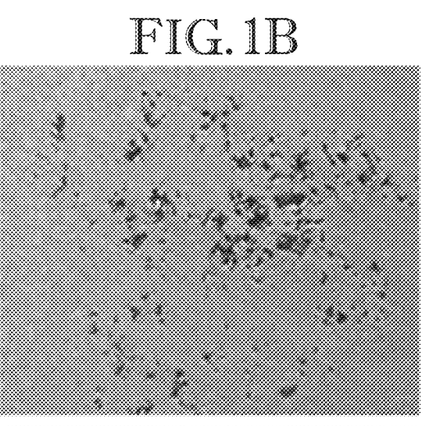
FIG. 1B is another image of a cast metal matrix including solidification shrinkage in accordance with the prior art.
Figure 1C:
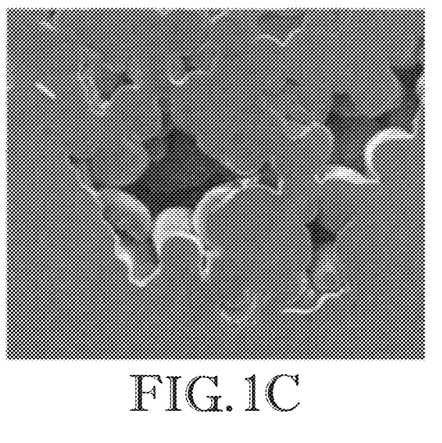
FIG. 1C is another image of a cast metal matrix including solidification shrinkage in accordance with the prior art.
Figure 1D:
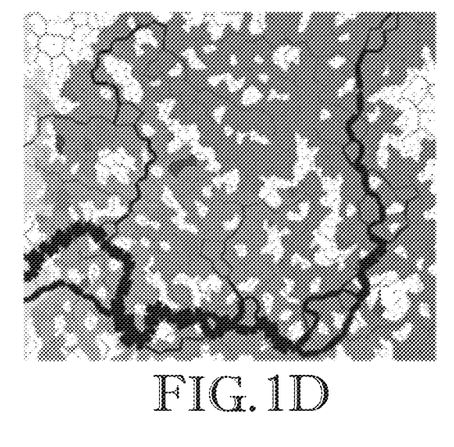
FIG. 1D is an image of a cast metal matrix including a hot tear in accordance with the prior art.
Figure 2:
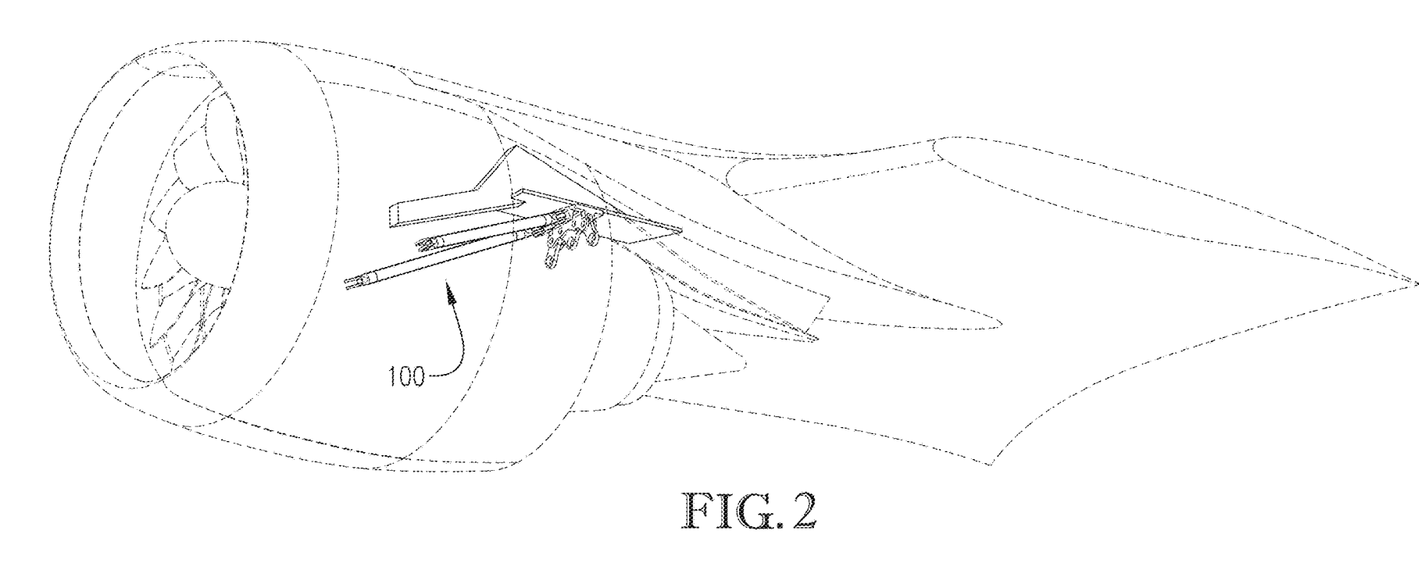
FIG. 2 is a perspective view of a part treated according to an embodiment of the invention.
Figure 3A:
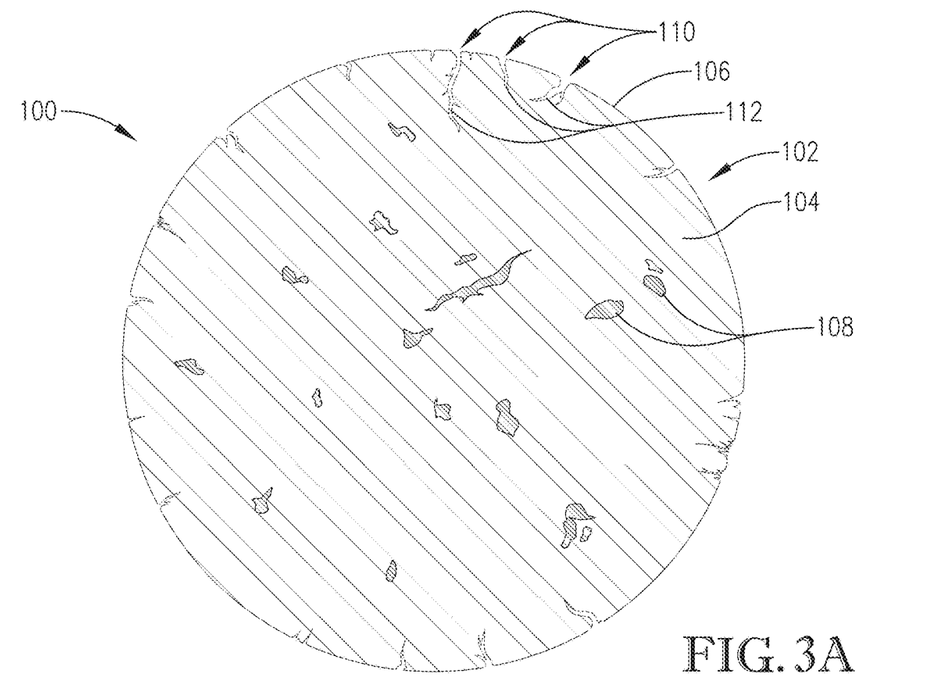
FIG. 3A is a cutaway view elevation view of a pre-treated cast metal matrix of a casting of the part shown in FIG. 2.
Figure 3B:
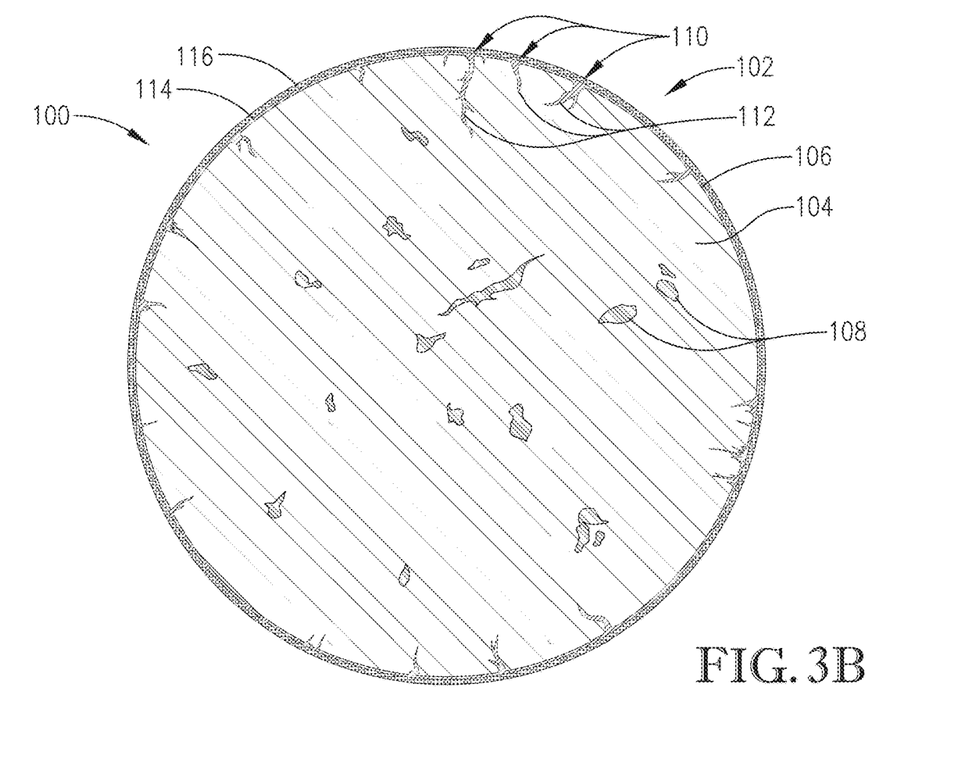
FIG. 3B is a cutaway view elevation view of the pre-treated cast metal matrix of FIG. 3A including surface depositions.
Figure 3C:
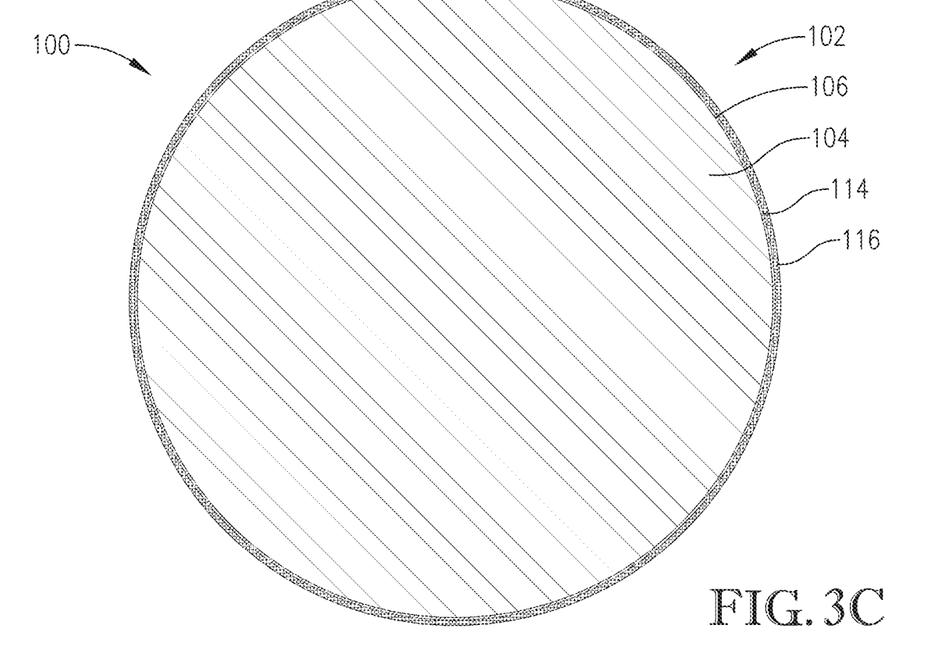
FIG. 3C is a cutaway view elevation view of the cast metal matrix of FIG. 3B after hot isostatic pressing.
Figure 3D:
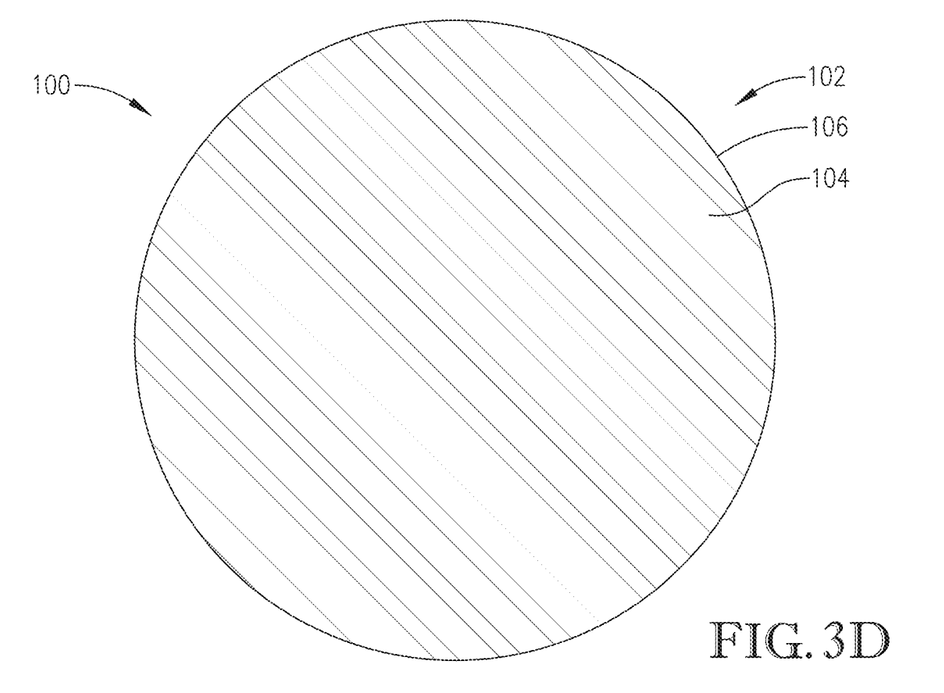
FIG. 3D is a cutaway elevation view of the cast metal matrix of FIG. 3C after hot isostatic pressing and after post-treatment.
Figure 4:
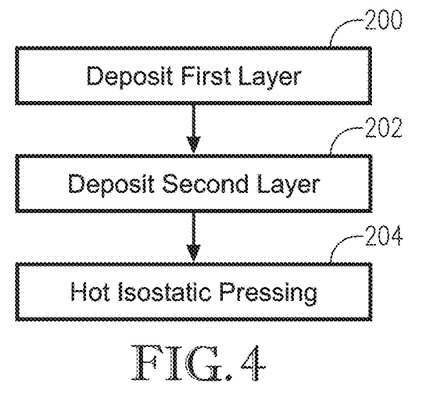
FIG. 4 is a flow diagram depicting certain method steps in accordance with an embodiment of the invention.

Turning to FIG. 4, and with reference to FIGS. 2-3D, a method of treating a cast metal matrix of a casting (e.g., casting 102) in accordance with an embodiment of the invention will now be described. First, the outer surface 106, including the surfaces 112 of the outer surface-connected voids 110, may be coated to create a uniform, self-fluxing first layer 114, as shown in block 200. The coating can be accomplished by way of autocatalytic deposition or other similar manner. The first layer 114 may have controlled thickness and composition of effective melting point depressants such as boron or phosphorous. The coating reaches deep into the outer surface-connected voids 110 that cannot otherwise be easily accessed.

The first layer 114 may include nickel, nickel-chromium, nickel-cobalt, nickel-cobalt-chromium or the like via phosphorous or boron-containing autocatalytic solution. The first layer 114 may have a composition of between approximately 0.5% to approximately 14% phosphorous or between approximately 0.5% to approximately 12% boron. For cast alloys that are highly susceptible to forming large volumes of solidification shrinkage porosity, solutions containing boron are preferable since boron, being a small atom, can diffuse easier into the cast metal matrix 104 once thermally treated. On the other hand, phosphorous-containing solutions are preferable for alloys that are not prone to large volumetric shrinkage. Phosphorous-containing solutions act as self-fluxing melt point depressants with the added ability to bond adjoining defect surfaces that are highly reactive and might be prone to formation of oxides or nitride films. Alternatively, the first layer 114 may include both phosphorous and boron-containing solutions.

Both phosphorous and boron used for autocatalytic deposition are very effective melting point depressants and allow complete bonding or adjoining void surfaces well below the melting temperature of the cast metal matrices upon subsequent diffusion bonding operations depending on the composition and thickness of the autocatalytically deposited layer.

The first layer 114 should be relatively thin. In some embodiments, the first layer is just enough to fully cover the surfaces 112 of the outer surface-connected voids 110 with melting point depressant and auto-fluxing coating to aid full diffusion bonding and healing of the surfaces 112 as they come together via hot isostatic pressing well below the melting temperature of the cast metal matrix 104, as discussed in more detail below. In some embodiments, the first layer 114 is less than about 0.0005 inches thick. In further embodiments, the first layer 114 may have a thickness between about 0.0002 inches and about 0.002 inches. In yet other embodiments, the first layer 114 includes both types of autocatalytic solutions (phosphorous and boron) having a thickness greater than about 0.00075 inches. In further embodiments, the first layer 114 has a thickness of between 0.0002 inches and 0.0005 inches. In still other embodiments, the autocatalytic deposition creates a uniform coating regardless of surface geometry.

The outer surface 106 of the cast metal matrix 104 may then be subjected to another coating (e.g., via electroplating) to create a second layer 116 over the outer surface 106, thereby closing off the outer surface-connected voids 110, as shown in block 202. In other words, this step seals the outer surface 106, thus effectively changing the outer surface-connected voids 110 into internal voids (hereinafter closed-off outer surface-connected voids). The second layer 116 may include nickel, cobalt, chromium, or a co-deposition thereof for iron, nickel, or cobalt base castings. Alternatively, the second layer 116 may include copper for titanium castings. For example, shrink prone titanium alloy cast metal matrices such as those formed of Ti-6-2-4-2, Beta C, Ti-15-3-3-3, and Beta 21S can be electroplated with copper instead of nickel. Additionally, aluminum or other precipitation hardening elements can be co-deposited with electroplating in the form of powders that have been pre-coated with nickel. This is especially useful for precipitation hardening nickel base superalloys. The thickness of the second layer 116 may vary depending on end-use application.

The cast metal matrix 104 may then be subjected to hot isostatic pressing, as shown in block 204. Hot isostatic pressing may include placing the cast metal matrix 104 in a chamber (e.g., a high temperature furnace enclosed in a pressure vessel). Temperature, pressure, and process time may be precisely controlled to achieve optimum results. The cast metal matrix 104 may be heated in an inert gas, which applies pressure uniformly in all directions to the outer surface 106 of the heated cast metal matrix 104. The heat causes the cast metal matrix 104 to become "plastic", allowing internal voids (internal voids 108 and closed-off outer surface-connected voids 110) to collapse under the differential pressure between the ambient atmosphere outside the casting 102 and the internal voids. The surfaces of the internal voids 108, 110 produce a metallurgical bond via diffusion of atoms, thereby collapsing or destroying the internal voids 108, 110, effectively eliminating any defects, and improving mechanical properties of the casting 102.

The cast metal matrix 104 may be pressurized between about 14,500 psi and about 45,000 psi at temperatures between about 1,950° F. to about 2,200° F. for iron, nickel, or cobalt base alloys, and at between about 14,500 psi to about 25,000 psi and between about 1,600° F. to about 1,850° F. for titanium alloys. The hot isostatic pressing may be performed between about 2 hours and about 5 hours at a target temperature.

Importantly, the phosphorous and/or boron of the first layer 114 diffuses out of the surfaces 112 of the closed-off outer surface-connected voids 110 and into the cast metal matrix 104. This in turn reduces their concentration at the surfaces 112 of the closed-off outer surface-connected voids 110, which increases the melting temperature near the closed-off outer surface-connected voids 110 until cast metal matrix 104 near the closed-off outer surface-connected voids 110 isothermally solidifies and produces a strong, complete metallurgical bonded joint.

Figure 5:
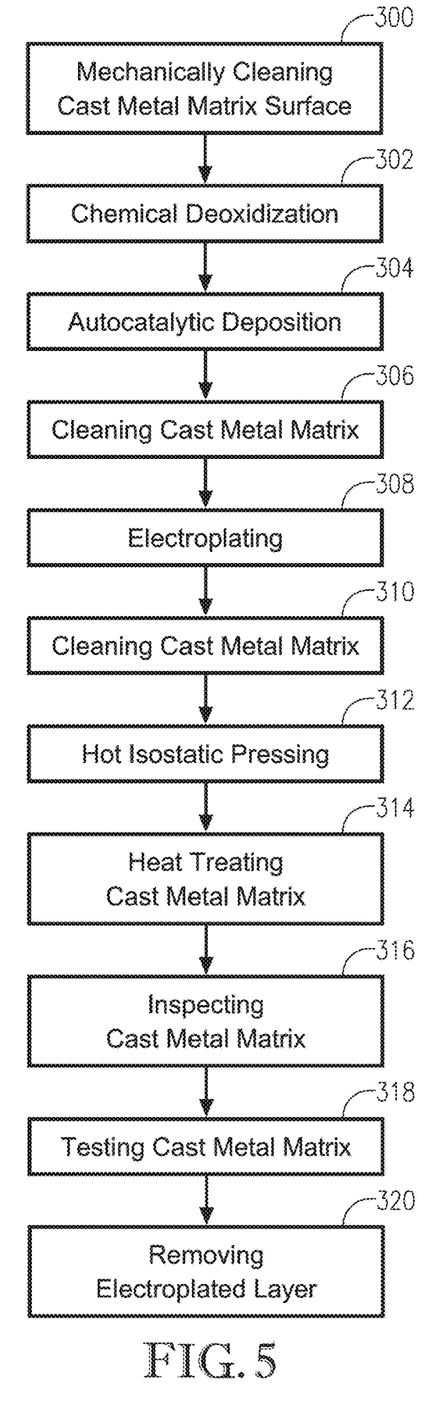
FIG. 5 is a flow diagram depicting certain method steps in accordance with another embodiment of the invention.

Turning to FIG. 5, and with reference to FIGS. 2-3D, a method of treating a cast metal matrix of a casting (e.g., casting 102) in accordance with another embodiment of the invention will now be described. First, the outer surface 106 of the cast metal matrix 104 of the casting 102 is mechanically cleaned, as shown in block 300. For example, the outer surface 106 may be cleaned via sandblasting, grinding, abrasive blasting, machining, a combination thereof, or any other suitable mechanical cleaning. This removes contaminants and scaling from the outer surface 106.

The outer surface 106 of the cast metal matrix 104 is then chemically cleaned, as shown in block 302. For example, the outer surface 106 may be cleaned via degreasing, solvent cleaning, vapor degreasing, alkali cleaning, a combination thereof, or any other suitable chemical cleaning. Chemical cleaning may include or may be followed by etching or deoxidizing to remove oil, dirt, contaminants, oxide films. This also acts as a surface activation of the outer surface 106, including the surfaces 112 of the outer surface-connected voids 110. Surface activation in this sense is a chemical or charge modification of a surface to improve the results of further surface treatment such as autocatalytic deposition or electroplating.

The outer surface 106, including the surfaces 112 of the outer surface-connected voids 110, is then coated via autocatalytic deposition to create a uniform, self-fluxing first layer 114, as shown in block 304. The first layer 114 may have controlled thickness and composition of effective melting point depressants such as boron or phosphorous. The autocatalytic deposition reaches deep into the outer surface-connected voids 110 that cannot otherwise be easily accessed.

The cast metal matrix 104, or more specifically the first layer 114, is then cleaned, as shown in block 306. This may include mechanical or chemical cleaning as described above.

The outer surface 106 of the cast metal matrix 104 is then subjected to electroplating to create a second layer 116 over the outer surface 106, thereby closing off the outer surface-connected voids 110, as shown in block 308.

The cast metal matrix 104, or more specifically the second layer 116, is then cleaned, as shown in block 310. This may include mechanical or chemical cleaning as described above. The cast metal matrix 104 is then subjected to hot isostatic pressing, as shown in block 312.

The cast metal matrix 104 is then inspected, as shown in block 314. Inspection ensures removal of all internal voids (internal voids 108 and closed-off outer surface-connected voids 110) and defects.

The cast metal matrix 104 is then heat treated, as shown in block 316. Heat treating may impart desired mechanical properties, such as increased strength, to the cast metal matrix.

The cast metal matrix 104 is then tested, as shown in block 318. Testing may include non-destructive testing (NDI), strength testing, electrical testing, and the like.

The electroplated second layer 116 is then removed, as shown in block 320. This may be performed via chemical stripping, machining, or the like.

The above-described methods and casting 102 provide several advantages. For example, closing off the outer surface-connected voids 110 allows them to be healed via hot isostatic pressing.

However, closing off the outer surface-connected voids 110 is not always sufficient. Complete metallurgical bonding is essential for optimum mechanical properties. Otherwise, collapsing voids into oxide inclusions, for example, still results in metallurgical discontinuities, and a void changing from a spherical pore into a linear discontinuity can actually increase stress intensity factors, thereby lowering the fatigue performance in some configurations.

This is addressed by removing insoluble oxide or nitride films from the surfaces 112 of the outer surface-connected voids 110. Further improvement is obtained by cleaning and hence surface activation that penetrates all the way through the closed-off outer surface-connected voids 110. This is assisted by formation of a transient liquid phase achieved through uniform coating of the outer surface-connected voids 110 via autocatalytic coating with solutions containing melting point depressants. In other words, joining is enhanced by wetting and adjoining surfaces of the outer surface-connected voids 110 and reducing the incipient melting temperature at the surfaces 112 of the closed-off outer surface-connected voids 110.

This results in isothermal solidification and diffusion bonding of the adjoining surfaces of the closed-off outer surface-connected voids 110. After initial melting, the diffusion of elements away from the surfaces 112 of the closed-off outer surface-connected voids 110 into the cast metal matrix 104 reduces the concentration of melting point depressant causing isothermal solidification and complete bonding of the surfaces 112 of the healed outer surface-connected voids 110. Furthermore, co-electrodeposition of key elements such as nickel, chromium, iron, and pre-electroless nickel coated titanium or aluminum powders can allow coating with similar chemistry as the parent metal, thereby eliminating alloy dilution and the need for subsequent removal of the electroplating second layer 116 after hot isostatic pressing.

The above-described process helps eliminate scrap and the need for rework, thereby saving hundreds of millions of dollars in the aircraft industry alone. The above quality, performance, and economic enhancements greatly reduce superalloy and stainless-steel casting acquisition costs and help increase share of high-performance casting for aircraft and defense applications.

The invention claimed is:

1. A method of treating a cast metal matrix, the method comprising steps of:
   depositing a self-fluxing first layer of material on an outer surface-connected void of the cast metal matrix;
   depositing a second layer of material on the self-fluxing first layer of material on the cast metal matrix thereby closing off the outer surface-connected void so that the outer surface-connected void is an effective internal void;
   hot isostatic pressing the cast metal matrix, the self-fluxing first layer of material, and the second layer of material; and
   during the hot isostatic pressing, forming the self-fluxing first layer of material into a transient liquid phase, then diffusing the transient liquid material into the cast metal matrix to increase melting temperature at a surface of the cast metal matrix, whereby the method of treating the cast metal matrix facilitates healing the effective internal void and complete metallurgical bonding of surfaces of the outer surface-connected void.

2. The method of claim 1, the first layer of material being deposited via autocatalytic coating.

3. The method of claim 1, the first layer of material including at least one of nickel, nickel-chromium, nickel-cobalt, and nickel-cobalt-chromium and including at least one of phosphorous-containing solution and boron-containing solution.

4. The method of claim 1, the second layer of material being deposited via electroplating.

5. The method of claim 1, the second layer of material including at least one of nickel, cobalt, chromium, copper, aluminum and a nickel-precoated material.

6. The method of claim 1, further comprising a step of mechanically cleaning the outer surface of the cast metal matrix before depositing the self-fluxing first layer of material.

7. The method of claim 1, further comprising a step of chemically cleaning the outer surface of the cast metal matrix including within the outer surface-connected void before depositing the self-fluxing first layer of material.

8. The method of claim 1, further comprising a step of cleaning the self-fluxing first layer of material between the step of depositing the first layer of material and the step of depositing the second layer of material and a step of cleaning the second layer of material between the step of depositing the second layer of material and the step of hot isostatic pressing.

9. The method of claim 1, further comprising a step of heat treating the cast metal matrix after the step of hot isostatic pressing.

10. The method of claim 1, further comprising a step of at least one of chemically milling and machining the cast metal matrix to remove the second layer from the cast metal matrix.

* * * * *